United States Patent
Thea

(10) Patent No.: US 9,124,844 B2
(45) Date of Patent: Sep. 1, 2015

(54) METHOD OF MANAGING THE RECEIPT OF A COMMAND TO CHANGE SERVICES IN A DIGITAL TELEVISION DECODER

(75) Inventor: Eric Thea, Rueil-Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 705 days.

(21) Appl. No.: 13/122,207

(22) PCT Filed: Sep. 29, 2009

(86) PCT No.: PCT/FR2009/051849
§ 371 (c)(1),
(2), (4) Date: Jun. 21, 2011

(87) PCT Pub. No.: WO2010/037966
PCT Pub. Date: Apr. 8, 2010

(65) Prior Publication Data
US 2011/0243251 A1 Oct. 6, 2011

(30) Foreign Application Priority Data
Oct. 2, 2008 (FR) ...................................... 08 56684

(51) Int. Cl.
| | |
|---|---|
| H04N 7/12 | (2006.01) |
| H04N 5/44 | (2011.01) |
| H04N 21/234 | (2011.01) |
| H04N 21/2381 | (2011.01) |
| H04N 21/434 | (2011.01) |
| H04N 21/438 | (2011.01) |
| H04N 21/4385 | (2011.01) |
| H04N 21/44 | (2011.01) |
| H04N 21/643 | (2011.01) |

(52) U.S. Cl.
CPC ......... *H04N 5/4401* (2013.01); *H04N 21/2381* (2013.01); *H04N 21/23424* (2013.01); *H04N 21/434* (2013.01); *H04N 21/4345* (2013.01); *H04N 21/4381* (2013.01); *H04N 21/4382* (2013.01); *H04N 21/4384* (2013.01); *H04N 21/4385* (2013.01); *H04N 21/44016* (2013.01); *H04N 21/64322* (2013.01)

(58) Field of Classification Search
USPC ............. 725/95; 714/776; 370/432; 386/125; 375/240.25
See application file for complete search history.

(56) References Cited

U.S. PATENT DOCUMENTS

| 7,171,110 B1 * | 1/2007 | Wilshire ........................ 386/231 |
| 2002/0172198 A1 | 11/2002 | Kovacevic |

(Continued)

FOREIGN PATENT DOCUMENTS

| EP | 0 849 958 B1 | 6/1998 |
| JP | 2007-282001 | 10/2007 |

OTHER PUBLICATIONS

International Search Report as issued for PCT/FR2009/051849.

*Primary Examiner* — Tracy Li
(74) *Attorney, Agent, or Firm* — Pillsbury Winthrop Shaw Pittman LLP

(57) ABSTRACT

A method for managing, in a digital television decoder receiving a signal stream including a set of components distributed in at least one first data set and a second data set, the receipt of a command to change services, the method including: simultaneously transmitting the stream of signals received by the decoder to a demultiplexer and to a buffer memory of the digital television decoder, at least some of the components of the signal stream then being stored in the buffer memory; using the demultiplexer, extracting from the signal stream transmitted a set of operating components of the decoder; to the components stored in the buffer memory, applying a system for correcting data received to obtain corrected components; and carrying out the audio/video decoding of the corrected components.

15 Claims, 1 Drawing Sheet

(56) References Cited

U.S. PATENT DOCUMENTS

2006/0107187 A1* 5/2006 Hannuksela ............... 714/776
2007/0192812 A1 8/2007 Pickens et al.
2007/0256109 A1* 11/2007 Kwak ............................ 725/95
2008/0186995 A1* 8/2008 Kwon .......................... 370/432
2008/0225958 A1* 9/2008 Park et al. ............... 375/240.25

* cited by examiner

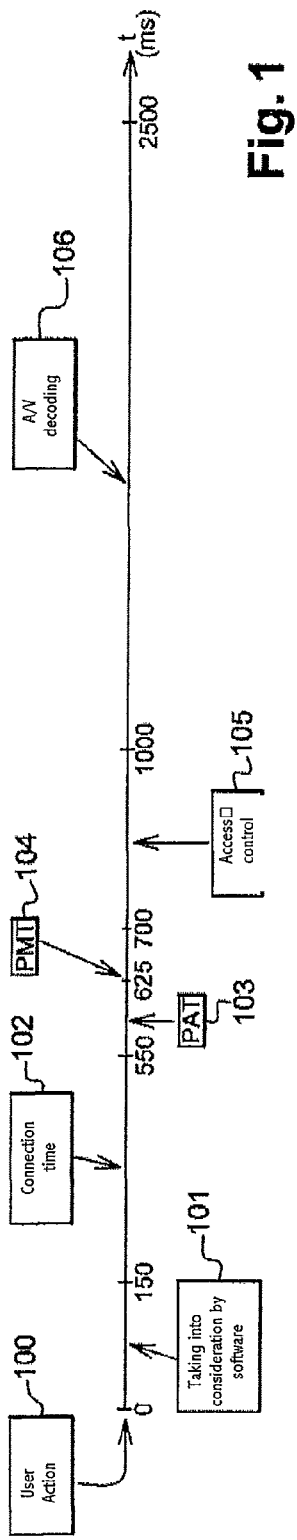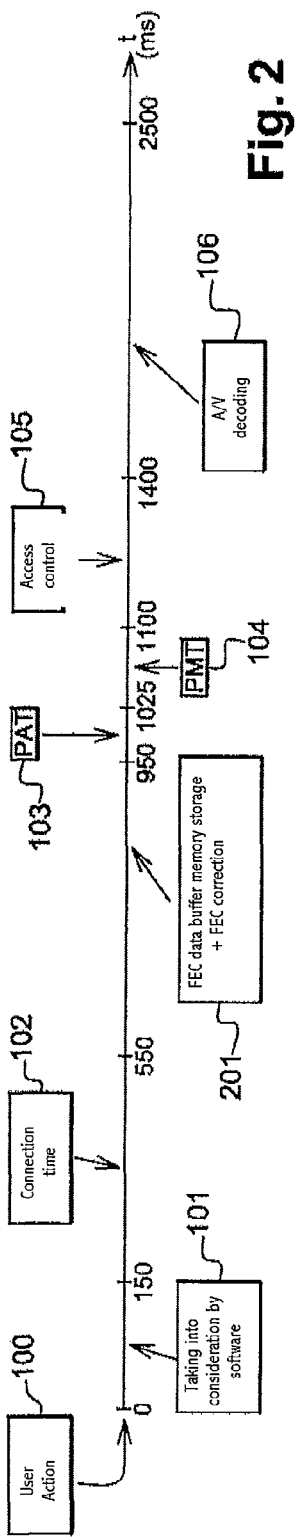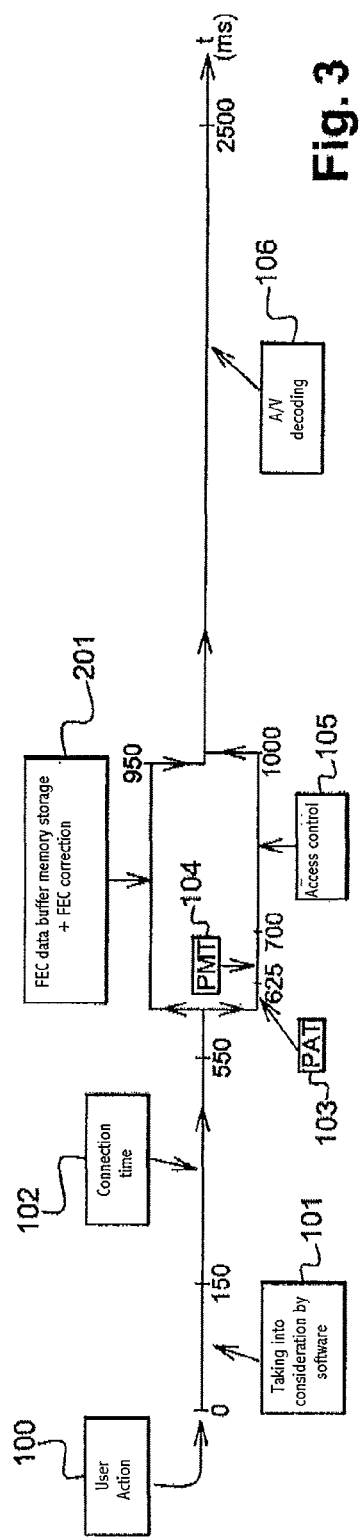

METHOD OF MANAGING THE RECEIPT OF A COMMAND TO CHANGE SERVICES IN A DIGITAL TELEVISION DECODER

CROSS REFERENCE TO RELATED APPLICATIONS

This application is the U.S. National Stage of PCT/FR2009/051849, filed Sep. 29, 2009, which in turn claims priority to French Application No. 0856684, filed Oct. 2 2008, the contents of which are incorporated herein by reference in their entirety.

TECHNICAL FIELD OF THE INVENTION

The object of the present invention is a method of managing the receipt of a command to change services in a digital television decoder. Service is usually understood to refer to what users call a television channel, for example a channel broadcasting programs successively to each other throughout the day. Nevertheless, services may be uniquely audio services or data or other services.

In particular, the object of the invention is to propose a method in which the integrity of data, particularly audio and video data, presents an advanced verification and correction operation, while presenting a service change time, or zapping time, comparable to the zapping times observed until now with transmissions in which the efficient data correction operation is not implemented.

In general, the field of the invention is that of digital television decoders. The invention will be more particularly described in the context of decoders receiving a stream of signals via the Internet network, decoders that will be subsequently designated as IP decoders, but the implementation of the method according to the invention is not limited to this type of decoder.

In the digital television field, digital television decoders are utilized, particularly in order to access a set of television channels that are transmitted scrambled and that are descrambled within the decoder. Television decoders are interface parts between systems for transmitting television signals, particularly digital television signals in MPEG and DVB formats, and display monitors. Often, the monitor itself comprises circuits to descramble these television signals, but this is not required. The signals exchanged are most often digital signals, but a descrambler may also be able to process analog signals.

The transmission means that transmit television programming to these decoders/receivers are either conventional antenna transmission means, or coaxial or even optical cables, or retransmission satellites that serve a region, or even the Internet network. The decoder comprises reception means to receive the signals transmitted and formatting means to transform the signals received into signals directly applicable to the display device control parts. For a cathode ray tube, these are, for example, commands applied to the scanning parts and to the various electron guns producing color pixels on the screen.

Formatting is carried out by respecting the parameter tables for each of the images to be represented. Different types of tables are distinguished: SI (System Information) tables, PSI (Program Specific Information) tables, NIT (Network Information Table) tables, EIT (Event Information Table) tables, PAT (Program Association Table) tables, CAT (Control Access Table) tables or else PMT (Program Map Table) tables, etc.

In digital television, it is provided that the parameter signals are transmitted in the stream (i.e., with the video signal itself) in data packets. The data packets transmitted are arranged in sections, the sections usually comprise 1024 bytes or, in some cases, 4096 bytes. Once received, the various packets are assigned to the appropriate tables. Packets from a same table are not necessarily grouped in a same section. They may be distributed in successive sections, interleaved with data packets relative to other tables or to the video or audio signal, data or other signal. In each section, identifiers enable data packets to be assigned to particular tables from among other tables. In reception, a decoder does not at first know how the data packets are distributed but it may recognize a division of sections. The decoder thus must read the identifier in each section and reorganize the data to assign the data to the correct tables. All the parameter signals relative to the various tables are edited by television operators or transport media managers, incorporated in the stream of this operator and conveyed to the users by various media.

On the whole, the entire table structure is thus distributed, in particular according to standard EN 300 468 and the object of the decoder is to reconstruct all the tables to have control information as well as information to display for the users. In each stream of multiplexed signals sent, no matter the physical support utilized, a table known as the PAT or Program Association Table is broadcast. This table, which is a PSI table defined in standard ISO/IEC 13818-1, provides the list of services available in the multiplexed signal stream under consideration; It thus provides the list of PMT, Program Map Table, tables (PSI table defined in standard ISO/IEC 13818-1), that are associated with each of the services, and that defines, for each service, the list of components associated with this service.

In particular, for each service, access control information associated with this service is found in the PMT table. The CAT access control table enables this information to be removed and enforces the transmission of this information to a microprocessor of the decoder, the latter may then determine if the user of the decoder has rights over this service. If this is the case, the microprocessor sends appropriate information that enables a digital descrambling key for the service under consideration to be obtained. The latter may then be restored in unscrambled mode on a display screen.

Standard MPEG2 enables several services in the same Transport Stream (TS) or channel to be multiplexed. This standard is supplemented by the DVB standard that enables services to be set up and changed or enables zapping over several multiplexed signal streams within the same and single network.

TECHNOLOGICAL BACKGROUND OF THE INVENTION

In the prior art, a zapping operation on an IP decoder follows the various steps shown in the time chart of FIG. 1. In this figure, the initial time (t=0) is marked as being the time when a user performs an action 100 to carry out a change of service. Such an action is most often constituted by pressing on one or more appropriate keys of a remote control associated with the decoder. The passage of zapping time is marked with relation to this time reference.

A first step 101 then resides in the software for operating the IP decoder to take the action of the user into account. The duration of this step is typically 150 ms (milliseconds). This duration is particularly utilized so that the operation software releases a specific application for zapping, possibly for an exchange with a remote server to obtain various requests, and also to verify that the user does not, during this time interval, send an instruction cancelling the zapping command initially received.

Then a second step 102 follows, in the course of which the IP decoder executes a command known as the "IGMP join command." The duration of this step is close to 400 ms; it corresponds to a decoder connection time, the time necessary, from the execution of the IGMP join command, to receive the first appropriate data packets extracted from a multicast signal stream. In the case of terrestrial, satellite or cable decoders, the decoder connection time corresponds to the time that elapses between an action on the decoder tuner and the effective receipt of the first data packets.

An operation to store in a buffer memory the data received in the stream, with demultiplexing of various components, is then carried out. However, such an operation takes an insignificant amount of time due to the hardware of the various intervening components.

Next the acquisition of various tables and parameters necessary to perform the zapping operation is carried out:

Thus, the next step 103, that typically lasts 75 ms, is a PAT table acquisition step.

Then, step 104 follows, with an average duration of 75 ms, in which the PMT table is acquired.

Next, in the following step 105, the access control is carried out; this lasts approximately 300 ms and essentially consists of:—an analysis of the descriptors from the PMT table (mainly the descriptor identified CA_descriptor—tag: 0x09);—then placing filters at the level of a demultiplexer of the decoder to receive the ECM (Entitlement Control Message, defined in the standard ISO/IEC 13818-1);—then a dialog with the smart card of the decoder to define if the user has rights over the desired service;—if yes, descrambling the ECM into control words CW; The control words will then be provided to the descrambler to access in unscrambled mode the various components of the desired service.

Once the various parameters and tables are acquired, in the next step 106, the audio and video decoding operation is carried out for the desired service. The time taken between sending the audio and video data to the audio and video decoder of the IP decoder and the effective display on the display screen is on the order of 1500 ms.

Thus, to carry out a zapping operation in IP decoders of the prior art, a duration close to 2500 ms is required.

The stream of signals transmitted to the IP decoders passes through DSLAM type equipment. The stream is then directly sent to the various IP decoders, with a progressive attenuation of the useful signal. The farther that an IP decoder user is situated from the DSLAM that provides the signal stream, the higher the signal-to-noise ratio, and the higher the risk of error in the reconstruction of audio-video signals. Consequently, in order to increase the number of users likely to be accessible from a given DSLAM without the signal being prohibitively noisy, the utilization of an advanced protection system against errors likely to be produced during data transmission has recently been proposed.

The FEC (Forward Error Correction) system has been chosen. In the future, other systems may possibly be chosen, without necessarily challenging the operation of the method according to the invention. In the implementation of the FEC system, the transmitter adds redundancy in order to enable the recipient, in this case the IP decoder, to detect and correct part of the errors that could have been produced. In addition, such a system, even if it necessitates information redundancy, enables retransmission to be avoided, and thus enables bandwidth to be saved.

In general, the operation of the FEC system may be considered as follows: The signal stream received by the IP decoder is constituted of a plurality of multiplexed components. In particular, the FEC system distributes the audio and video components into various sets of data, at least a first set of data and a second set of data, that are each organized in matrix form, respectively a first matrix and a second matrix of audio and video data. A redundant correction datum corresponds to each line or column of the matrix: If one of the audio-video data from a column was tainted with an error, then the datum under consideration may be corrected from the correction datum associated with the column under consideration, and non-corrupted data from the same column.

FIG. 2 represents an example of embodiment of a zapping operation on a signal stream in which the FEC correction system is in place. The first two steps of the zapping operation from this example are identical to the two steps from the example illustrated in FIG. 1. At the end of step 102, marked by a connection time on the order of 400 ms, in step 201, at least a first data set and a second data set are stored in buffer memory and then the audio-video components thus stored are corrected.

In the FEC system, correction data from the first data set are transmitted with data from the second data set. Thus, non-correctable error risks are limited by spacing in time the audio-video data and the correction data likely to be used to correct the audio-video data under consideration. A consideration of such an operation is that it is necessary to store at least two matrices, or two data sets, before being able to initiate FEC system correction operations. Thus, by considering a signal stream of the SD (Simple Definition) type at 2.2 Mbits/s, and a matrix size of 8 columns by 5 lines, the buffer memory storage time and the correction implementation time is close to 400 ms.

Step 201 thus ends, with the corrected audio-video components obtained, approximately 950 ms after the action by the user to change the service. Step 201 is crucial to offering good audio-video quality since, contrary to the operating components, any loss of audio-video data risks creating visual defects, of the macro block, frozen or jerky picture, black screen, etc., type. At the end of step 201, steps 103, 104, 105 and 106, detailed during the description of the first example of embodiment, are repeated.

In such an example, the zapping operation is thus on the order of 2900 ms; Thus a significant increase on the order of 20% of the zapping time is observed.

GENERAL DESCRIPTION OF THE INVENTION

The method according to the invention proposes a solution to the problems and disadvantages that have just been stated. In the invention, a solution for implementing an FEC type correction system is proposed, while maintaining a zapping time comparable to that observed before the use of such a zapping time. For this purpose, in the invention, carrying out several operations necessarily intervening in a service change method is proposed.

The invention thus essentially relates to a method for managing, in a digital television decoder receiving a signal stream comprising a set of components distributed in at least one first data set and a second data set, the receipt of a command to change services;

characterized in that the method comprises different steps consisting of:

simultaneously transmitting the stream of signals received by the decoder to a demultiplexer and to a buffer memory of the digital television decoder, at least some of the components of the signal stream then being stored in said buffer memory;

by means of the demultiplexer, extracting from the signal stream transmitted a set of operating components of the decoder; operating components is understood to refer to stream components that are necessary for the constitution of the previously mentioned tables, and more particularly the tables intervening in a service change operation;

to the components stored in the buffer memory, applying a system for correcting data received to obtain corrected components;

carrying out the audio/video decoding of the corrected components.

The method according to the invention may comprise, in addition to the main steps that have just been mentioned in the previous paragraph, one or more additional characteristics from among the following:

the correction system applied to the components stored in the buffer memory is an FEC type system;

the step of storing the components in the buffer memory of the decoder consists of storing at least the first data set, particularly comprising a first set of audio and video components, and the second data set, particularly comprising a second set of audio and video components and correction data from the first set of audio and video components;

the step consisting of carrying out the audio/video decoding of components from the first set of corrected audio-video data comprises a preliminary step consisting of completing:

an operation to correct the first set of audio and video data by means of correction data comprised in the second data set; and an operation to conclusively verify the integrity of the operating components extracted, by means of the demultiplexer, from the stream of transmitted signals; conclusive verification operation refers to a verification operation that has not revealed erroneous components;

the operating components comprise integrity verification means of the CRC type;

in the method according to the invention, if the operation to verify the integrity of the operating components extracted by means of the demultiplexer of the first set of data from the stream of signals transmitted results in error detection and as the operation to correct the first set of audio and video data by means of correction data comprised in the second data set is completed, said method comprises the additional step consisting of renewing the operation to verify the integrity of the operating components extracted by means of the demultiplexer from a data set following the stream of signals transmitted;

the operating components extracted from the signal stream by means of the demultiplexer comprise at least one of the following components: PMT tables; PAT table; access control data;

the stream of signals received by the decoder is a stream of signals transmitted according to the Internet protocol;

the signal stream received by the decoder is a stream of signals transmitted by cable, by terrestrial transmission means, or by satellite.

The different additional characteristics of the method according to the invention, insofar as they are not mutually exclusive, are combined according to all combination possibilities to result in different examples of embodiment of the invention.

The present invention also refers to a digital television decoder able to implement the method according to the invention, with its main characteristics, and possibly one or more additional characteristics that have just been mentioned.

The invention and its various applications will be better understood upon reading the following description and examining the accompanying figures.

BRIEF DESCRIPTION OF THE FIGURES

The figures are presented for indicative purposes and in no way limit the invention. The figures show:

FIG. 1, already described, a time chart illustrating the flow of a zapping sequence for a digital television decoder receiving a conventional signal stream via the Internet network;

FIG. 2, also already described, a time chart illustrating the flow, in the prior art, of a zapping sequence for a digital television decoder receiving a stream of signals following the FEC system via the Internet network;

FIG. 3, a time chart illustrating the flow, in an example of embodiment of the method according to the invention, of a zapping sequence for a digital television decoder receiving a stream of signals following the FEC system via the Internet network.

DESCRIPTION OF PREFERRED FORMS OF EMBODIMENT OF THE INVENTION

The various elements appearing in several figures will keep, unless otherwise noted, the same references.

FIG. 3 illustrates a time chart illustrating the flow of an example of embodiment of the method according to the invention.

In this example, operations and steps 100, 101 and 102, already present in the first two examples, are repeated. At the end of step 102, the signal stream is simultaneously transmitted to:

the demultiplexer of the decoder, where an operating component extraction operation is carried out through steps 103, 104 and 105; and the buffer memory of the decoder in which the data stored undergo the FEC type correction process, in a step 201 identical to step 201 from the second example mentioned.

Data sent to the multiplexer thus are not data corrected by the FEC system. However, the integrity of the operating components exiting the demultiplexer is ensured by the following characteristics:

the operating components that are extracted from the stream by the multiplexer intrinsically comprise a CRC (Cyclic Redundancy Check), that enables it alone to verify the integrity of data constituting these components. If an operating component is detected as not being integrated by the CRC mechanism, in an advantageous example of embodiment of the invention, an occurrence of said component in the signal stream is expected;

the probability that an error affects the operating components under consideration is low since these data represent, in the signal stream, a much lower flow.

At the end of steps 201 and 105, audio-video decoding step 106 is implemented. Advantageously, starting this step 106 only takes place when step 201 of FEC system correction is finished for at least one matrix.

The implementation of the example described has an advantage due to the fact that the duration of steps 103, 104 and 105 on the one hand, and the duration of step 201 on the other hand, are relatively close. With relation to the second example described, a time savings on the order of 400 ms is achieved to carry out a service change operation, and thus a total duration on the order of 2500 ms is obtained, identical to the zapping duration from the prior art in the absence of the FEC correction system.

The decoder according to the invention notably comprises means to implement the method according to the invention, and notably a program memory with a first application to carry out FEC system corrections, a second application to simultaneously direct the stream of signals received to the demultiplexer and buffer memory mentioned, and a third application to delay the step to decode the audio-video stream as long as the operating component extraction and FEC correction operations have not ended at least for the first data set previously mentioned.

The invention claimed is:

1. A method for managing a receipt of a command to change services in a digital television decoder, the digital television decoder receiving a signal stream comprising a set of components distributed in at least one first data set and a second data set, the method comprising:
    simultaneously transmitting the signal stream received by the digital television decoder to a demultiplexer and to a buffer memory of the digital television decoder so that both the demultiplexer and the buffer memory receive said signal stream, at least some of the components of the signal stream being stored in said buffer memory;
    extracting from the transmitted signal stream, using the demultiplexer, a set of operating components of the decoder;
    applying, to the components stored in the buffer memory, a system for correcting data received in the buffer memory to obtain corrected components, a duration of the step of extracting and a duration of the step of applying being relatively close to each other, and
    carrying out the audio/video decoding of the corrected components.

2. The method according to claim 1, wherein the correction system applied to the components stored in the buffer memory is an FEC type system.

3. The method according to claim 2, wherein storing the components in the buffer memory of the decoder consists of storing at least the first data set, comprising a first set of audio and video components, and the second data set, comprising a second set of audio and video components and correction data from the first set of audio and video components.

4. The method according to claim 3, wherein carrying out the audio/video decoding of components from the first set of corrected audio-video data comprises preliminary completing:
    an operation to correct the first set of audio and video data using correction data comprised in the second data set; and
    an operation to conclusively verify the integrity of the operating components extracted, using the demultiplexer, from the stream of transmitted signals.

5. The method according to claim 4, wherein the operating components comprise CRC type integrity verification means.

6. The method according to claim 4, wherein if the operation to verify the integrity of the operating components extracted using the demultiplexer of the first set of data from the stream of signals transmitted results in error detection and as the operation to correct the first set of audio and video data using correction data comprised in the second data set is completed, said method comprises the renewing the operation to verify the integrity of the operating components extracted using the demultiplexer from a data set following the stream of signals transmitted.

7. The method according to claim 1, wherein the operating components extracted from the signal stream using the demultiplexer comprise at least one of the following components: PMT (Program Map Table) tables; PAT (Program Association Table) table; access control data.

8. The method according to claim 1, wherein the signal stream received by the decoder is a signal stream transmitted according to the Internet protocol.

9. The method according to claim 1, wherein the signal stream received by the decoder is a signal stream transmitted by cable, by terrestrial transmission means, or by satellite.

10. A digital television decoder configured to implement the method according to claim 1.

11. The method according to claim 1, wherein the duration of the step of extracting and the duration of the step of applying differ from each other by about 50 ms or less.

12. The method according to claim 1, wherein the step of extracting and the step of applying are carried out in parallel so that the duration of the step of extracting and the duration of the step of applying differ from each other by about 50 ms or less.

13. The method according to claim 1, wherein said signal steam is separately received by the demultiplexer and the buffer memory.

14. A method for managing a receipt of a command to change services in a digital television decoder, the digital television decoder receiving a signal stream comprising a set of components distributed in at least one first data set and a second data set, the method comprising:
    simultaneously transmitting the signal stream received by the digital television decoder to a demultiplexer and to a buffer memory of the digital television decoder so that both the demultiplexer and the buffer memory receive said signal stream, at least some of the components of the signal stream being stored in said buffer memory;
    extracting from the transmitted signal stream, using the demultiplexer, a set of operating components of the decoder;
    applying, to the components stored in the buffer memory, a system for correcting data received in the buffer memory to obtain corrected components, wherein said simultaneously transmitted signal stream is separately received by the demultiplexer and the buffer memory so that the step of extracting and the step of applying are carried out in parallel, and
    carrying out an audio/video decoding of the corrected components after said step of extracting and said step of applying.

15. The method according to claim 14, wherein a duration of the step of extracting and a duration of the step of applying differ from each other by about 50 ms or less.

* * * * *